United States Patent [19]

Johnston

[11] Patent Number: 4,648,931
[45] Date of Patent: Mar. 10, 1987

[54] METHOD OF FORMING BEAD SEAL IN BIAXIALLY ORIENTED POLYMER FILM BY HEAT BONDING

[76] Inventor: Orin B. Johnston, 16480 N. Hillcrest Ct., Eden Prairie, Minn. 55344

[21] Appl. No.: 733,702

[22] Filed: May 13, 1985

Related U.S. Application Data

[62] Division of Ser. No. 561,684, Dec. 15, 1983, Pat. No. 4,531,997.

[51] Int. Cl.$^4$ .................. B32B 31/18; B32B 31/20
[52] U.S. Cl. ................................ 156/251; 156/498; 156/499; 156/515; 156/583.1; 156/583.4; 156/583.9
[58] Field of Search ............... 156/251, 498, 499, 515, 156/583.1, 583.3, 583.4, 583.8, 583.9

[56] References Cited

U.S. PATENT DOCUMENTS

| | | | |
|---|---|---|---|
| 2,698,273 | 12/1954 | Miner et al. | 156/583.9 |
| 3,386,503 | 6/1968 | Corning et al. | 156/583.4 |
| 3,413,175 | 11/1968 | Rochla | 156/499 |
| 3,558,406 | 1/1971 | Kugler | 156/251 |
| 4,267,005 | 5/1981 | Barnaby | 156/251 |
| 4,273,604 | 6/1981 | Johnston | 156/583.4 |
| 4,502,906 | 3/1985 | Young et al. | 156/251 |

Primary Examiner—Caleb Weston

[57] ABSTRACT

Apparatus and method for heat sealing a selected segment of a web of at least two layers of biaxially oriented plastic film. The web layers are pressed together and a selected segment of the pressed web is heated above the bonding temperature of the plastic while adjacent web segments are maintained below that temperature. The surfaces pressing thus the heated web segment has a relatively lower surface friction than the surfaces pressing the adjacent web segment, whereby the layers of the heated segment of the web are physically unrestrained against shrinking during heating and are allowed to shrink back to their pre-oriented molecular configuration while the adjacent segment is restrained against movement. A hermetic bead seal is thus formed between the web layers. A product heat sealed according to the novel method is also disclosed.

4 Claims, 5 Drawing Figures

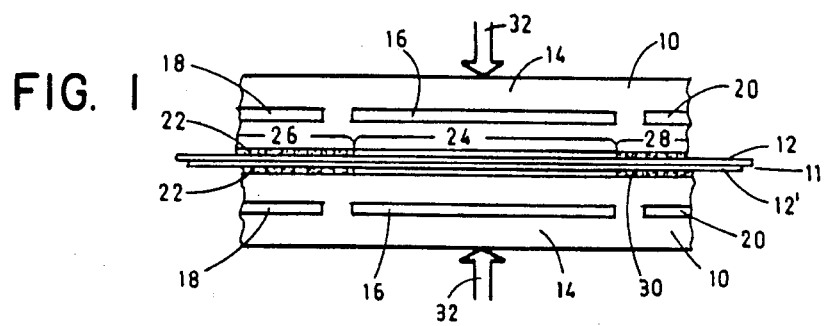
FIG. 1
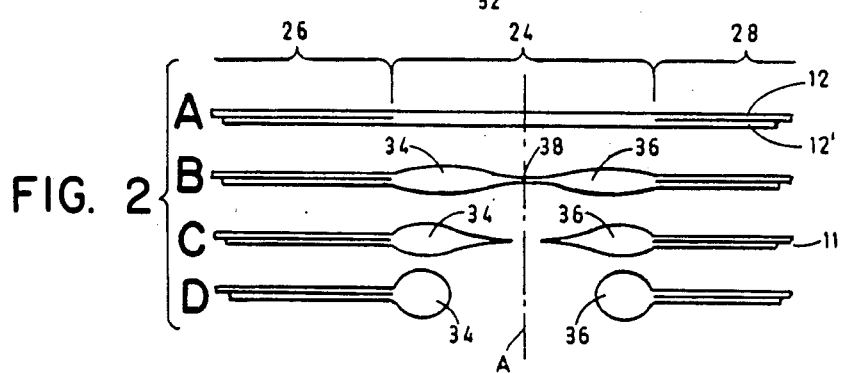
FIG. 2
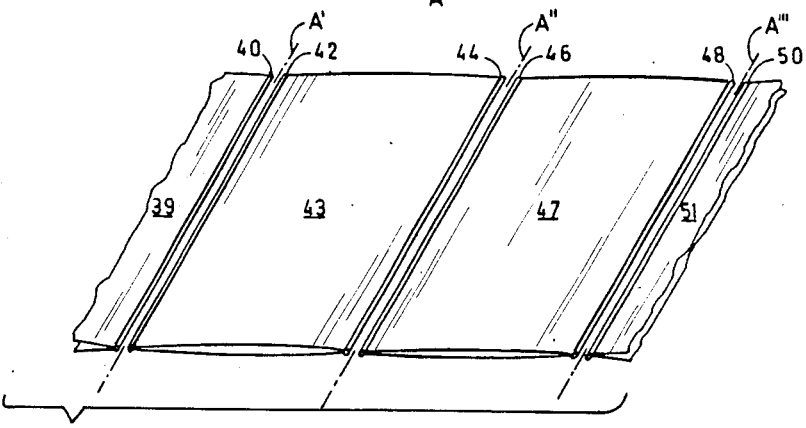
FIG. 3
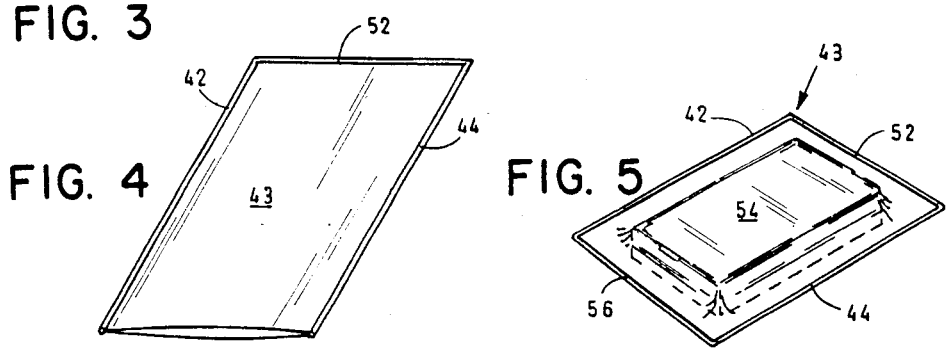
FIG. 4
FIG. 5

METHOD OF FORMING BEAD SEAL IN BIAXIALLY ORIENTED POLYMER FILM BY HEAT BONDING

This application is a division of application Ser. No. 561,684, filed Dec. 15, 1983, U.S. Pat. No. 4,531,997.

BACKGROUND OF THE INVENTION

This invention relates to heat bonding plastic films, and particularly to heat bonding biaxially oriented plastic films.

Biaxially oriented plastic films are stretched in both planar axes during manufacture to re-orient their molecular structure to increase tensile strength, toughness and flexibility. When the temperature of a biaxially oriented film is increased above a given temperature, e.g. for heat bonding, the film shrinks to its pre-oriented molecular configuration, unless restrained.

To utilize biaxially oriented films, e.g. MYLAR ® polyester film, in heat-sealed articles, it has previously been known to laminate such films to a layer of a non-shrinking, easily heat sealable polymer, e.g. polyethylene. To heat seal laminated films, e.g. in manufacture of the popular MYLAR ® novelty balloons, the polyethylene layers are placed in contact and the laminated films are locally heated to a temperature above the bonding temperature of the polyethylene, but below the level at which the biaxially oriented film will shrink.

With the foregoing in mind, it is an object of the invention to provide an apparatus and process for producing a sealed article by directly heat bonding two or more layers of biaxially oriented polymeric film.

It is another object to join two or more layers of biaxially oriented polymeric film by heat bonding to form a seal between the layers, comprising a smooth, solid homogeneous piece of plastic having complete molecular interlocking between layers of film.

It is still another object of the invention to provide a bead seal superior to classical bar or edge seals used in the plastic film packing industry, by allowing the manufacturer to operate with higher production speeds while providing more reliable quality control, better hermetic seals and less scrap film.

SUMMARY OF THE INVENTION

According to the invention there is provided in an apparatus for heat sealing a selected segment of a web comprising at least two layers of biaxially oriented plastic film, the apparatus having means for pressing the web layers together, means for simultaneously heating the selected segment to above bonding temperature, means for maintaining an adjacent segment of the web below bonding temperature, and means for cooling the selected segment sufficiently quickly to avoid degradation of the plastic, the means for pressing including pressing surfaces for pressing contact with the web, the following improvement:

The pressing surfaces in contact with the selected segment of the web subjected to heating above bonding temperature have relatively lower surface friction than the pressing surfaces in contact with the adjacent segment of the web, whereby the heated segment of the web is physically unrestrained by the surfaces against shrinkage during heating and is allowed to shrink back to pre-oriented molecular configuration while the web in the adjacent segment is restrained against movement, thereby providing for formation of a hermetic bead seal between the layers of the web.

In preferred embodiments, a pair of hermetic bead seals is formed on opposite sides of the centerline of the selected segment subject to heating to above bonding temperature; the novel apparatus is adapted to subject a multiplicity of selected spaced apart segments of web simultaneously to heating to above bonding temperature, whereby a multiplicity of spaced apart bead seals is simultaneously formed, preferably the means for simultaneously subjecting the multiplicity of selected segments of web to heating to above bonding temperature are disposed and arranged to seal the web to form a pouch having an opening to provide for placing an article therein, the apparatus being further adapted for sealing the opening of the pouch to enclose the article therein; and the pressing surfaces in contact with the selected segment of web subjected to heating above bonding temperature are treated with a low friction substance preferably selected from the group of silicone lubricants and fluorocarbon films.

According to another aspect of the invention, the method of heat sealing a selected segment of a web comprising at least two layers of biaxially oriented plastic film comprises pressing the layers of the web together, heating a selected segment of the web to above bonding temperature of the plastic, allowing the heated segment of the web while so pressed to shrink back to its pre-oriented molecular configuration while restraining an adjacent segment of the web against movement by pressing and maintaining the temperature thereof below bonding temperature, and cooling the heated segment sufficiently quickly to avoid degradation of the plastic, thereby permitting the formation of a hermetic bead seal between the layers of the web.

A preferred method of this aspect of the invention comprises forming a pair of hermetic bead seals on opposite sides of the centerline of the selected segment subject to heating to above bonding temperature; the method includes subjecting a multiplicity of selected spaced apart segments of the web simultaneously to heating to above bonding temperature simultaneously to form a multipliciy of spaced apart bead seals, and, preferably, the method comprises simultaneously subjecting the multiplicity of selected segments of web to heating to above bonding temperature to seal the web to form a pouch having an opening, placing an article therein, and similarly sealing the pouch opening thereby enclosing the article therein.

Still another aspect of the invention comprises the heat sealed product resulting from heat sealing a selected segment of a web comprising at least two layers of selected biaxially oriented plastic film by pressing the web layers together, heating the selected segment of the web to above bonding temperature of the plastic, allowing the heated segment of the web while so pressed to shrink back to its pre-oriented molecular configuration while restraining an adjacent segment of the web against movement by pressing, and maintaining the temperature thereof below the bonding temperature, cooling the heated segment sufficiently quickly to avoid degradation of the plastic, thereby permitting the formation of a hermetic seal between the layers of the web.

Still further objects, features and advantages will become apparent from the following detailed description of preferred embodiments thereof taken in conjunction with the accompanying drawings.

BRIEF DESCRIPTION OF THE DRAWINGS

FIG. 1 is an end cross-section view showing somewhat schematically opposed diaphragms from heat bonding, e.g. a web formed of two layers of biaxially oriented film;

FIGS. 2A, 2B, 2C and 2D are end views showing, sequentially, the changes in sections of film during its subjection to heat bonding; and FIG. 3 is a perspective view showing a web of plastic sealed and separated transversely at measured intervals, into separate pouches open at the ends, while FIG. 4 is a similar view showing a single pouch also sealed at one end along the film axis, and FIG. 5 shows the pouch of FIG. 4 closed about an article and sealed on both sides and both ends.

DETAILED DESCRIPTION OF A PREFERRED EMBODIMENT

Referring to FIG. 1, the opposed diaphragms 10, of identical construction, for heat sealing web 11 formed of two layers 12, 12' of biaxially oriented polymeric film, e.g. polyvinylidene chloride, are shown. As described more fully in my issued U.S. Pat. Nos. 3,964,958; 4,251,314; and 4,273,604, the diaphragms comprised bodies 14 of flexible material, e.g. silicone rubber, and, embedded therein, heater elements 16 and heat conductor elements 18, 20. The surface layer 22 of diaphragms contacting the web 11 is also silicone rubber. In the bonding area 24, that closest to heater element 16, surface 22 is smooth with relatively lower friction. In areas 26, 28 adjacent bonding area 24 and more remote from heater element 16, the surface 22 is comprised of silicone rubber with particles of sand 30 embedded therein to create a sandpaper-like surface of relatively higher friction.

The diagragms are urged into pressured contact with opposite sides of the web 11 by fluidic pressure, shown representatively by arrows 32.

OPERATION.

Still referring to FIG. 1, two layers of film 12, 12' in web 11 to be joined by heat bonding are placed together and positioned between the opposed diaphragms 10, with the area to be bonded beneath bonding area 24 of surface 22. Fluidic pressure 32 is applied to the diaphragms to bring them into pressured contact with the web 11. Heater element 16 is heated by passing an electric current through the element. The temperature of element 16 is maintained just below the bonding temperature, and increased during the bonding cycle by pulsing a high current through the element 16. Referring now also to FIGS. 2A through 2D, the increased temperature in the bonding area 24 increases the temperature of web 11 above the bonding temperature to initiate bonding between the film layers 12, 12', as shown in FIG. 2A. The temperature at surface 22 outside the bonding area, in adjacent areas 26, 28 more remote from heater element 16, is maintained below the bonding temperature as heat conductors 18, 20 conduct away some of the heat generated by heater element 16. This is shown in FIGS. 2A through 2D as the web 11 fails to bond away from area 24 close to the heater element.

Area 24 also has relatively lower friction which allows the web to contract to its pre-oriented state, while areas 26, 28 are of higher surface friction which forces the web to remain in the oriented state, even in presence of slightly elevated temperatures.

Referring now to FIG. 2B, the now bonded web 11 in area 24 under the effects of increased temperature has contracted from centerline A to initiate formation of bead seals 34, 36 at the end of unbonded sections of web 11, with a markedly narrowed section 38 lying on the centerline between the beads.

In FIG. 2C, the bead seals 34, 36 have separated at the centerline and contraction continues, the beads 34, 36 forming separately into homogeneous segments at the ends of web 11 with complete molecular interlocking between the plies.

In FIG. 2D, the seals have formed completely as solid smooth beads, with the film formerly in the bonding area now returned to its original pre-oriented state, with the film of both plies in a single, homogeneous mass. The actual final shape of the bead seals is controlled by molecular forces of the film being bonded, by the pressure, bonding temperature, bonding time, and time to cool the film below its flow temperature. For example, to form a generally cylindrical bead when joining two plies of biaxially oriented polyvinylidene chloride film SARAN ® sold by Dow Chemical Company, each 0.001 inch thick, a pressure of 60 psi is applied, with bonding temperature of 290° F., over 0.3 second, and a cooling time of 0.3 second to lower the temperature below the flow point. A substantially homogeneous bead seal with molecular interlocking between the film plies was formed having approximate dimensions in the X and Y direction of 0.006 inch and 0.005 inch, respectively. A total cycle time for bonding and cooling of less than one second is possible for some biaxially oriented plastic films up to 0.002 inch thick (0.508 millimeters).

As the seals are formed under pressure, the fluid plastic flows together to form a completely integrated mass, which creates a hermetic seal as impervious to transmission of fluids i.e. gases or liquids, as the original film itself.

Referring now to FIG. 3, a dual web of biaxially oriented film is shown after heat bonding for plastic packaging. Six bead seals 40, 42, 44, 46, 48 and 50 are shown formed in the web to produce pouches 39, 43, 47 and 51, open at both ends as shown. FIG. 4 shows the result of a second operating cycle in which a bead seal 52 has been formed to provide the bottom seal of pouch 43. In FIG. 5, article 54 has been placed in the pouch and a final bead seal 56 formed completely hermetically closing the pouch. Of course, the first three sealing operations can be performed simultaneously followed by inserting the article and completing the final seal; and, indeed, all four operations can be done simultaneously utilizing the invention.

ALTERNATE EMBODIMENTS

Other embodiments are within the following claims. For example, a number of sheets of biaxially oriented polymeric film, e.g. three sheets or more, may be placed together to be bonded together at the edge in a single, homogeneous bead seal. Also, further to decrease the friction between the film and the diaphragm surface in the bonding area, the surface may be locally coated with a fluorocarbon film, e.g. TEFLON ®, sold by E. I. duPont de Nemours Company, Inc. of Wilmington, Del., or the bonding area may be locally lubricated with silicone fluid. In the latter case, increasing the friction of the diaphragm surface outside of the bonding surface may be unnecessary.

I claim:

1. The method of forming a hermetic bead seal between adjacent layers of biaxially oriented plastic film in a selected segment of a web comprising pressing said layers in said segment together in a sealing zone, pressing an adjacent segment of said layers together in an unheated zone, heating the layers in said sealing zone to above bonding temperature of said plastic while so pressed, continuing to press said last named layers together while allowing them to shrink back to their pre-oriented molecular configuration, simultaneously restraining the layers of said adjacent segment in said unheated zone against movement while maintaining their temperature below said bonding temperature, and cooling said heated layers sufficiently quickly to avoid degradation of the plastic.

2. The method of claim 1 comprising forming a pair of said hermetic bead seals on opposite sides of the centerline of the heated selected segment.

3. The method of claim 1 comprising subjecting a multiplicity of selected spaced apart segments of said web simultaneously to heating to above bonding temperature simultaneously to form a multiplicity of spaced apart bead seals.

4. The method of claim 3 comprising simultaneously subjecting said multiplicity of selected segments to heating to above bonding temperature to seal said web to form a pouch having an opening, placing an article therein, and sealing the opening of said pouch, thereby enclosing said article therein.

* * * * *